United States Patent
Schmidt et al.

(10) Patent No.: US 12,494,520 B2
(45) Date of Patent: Dec. 9, 2025

(54) MAGNETIC FORCE DILATOMETER FOR MEASURING DILATION OF INDIVIDUAL ELECTRODE

(71) Applicant: GM GLOBAL TECHNOLOGY OPERATIONS LLC, Detroit, MI (US)

(72) Inventors: Robert D. Schmidt, Bloomfield Hills, MI (US); William Osad, Macomb, MI (US); Ratandeep Singh Kukreja, Auburn Hills, MI (US); Daad Bourhan Haddad, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 178 days.

(21) Appl. No.: 18/526,610

(22) Filed: Dec. 1, 2023

(65) Prior Publication Data
US 2025/0183391 A1    Jun. 5, 2025

(51) Int. Cl.
*H01M 10/48*  (2006.01)
*G01B 7/24*   (2006.01)
*H01M 10/42*  (2006.01)

(52) U.S. Cl.
CPC .............. *H01M 10/48* (2013.01); *G01B 7/24* (2013.01); *H01M 10/4285* (2013.01)

(58) Field of Classification Search
CPC ..... G01B 7/24; G01R 31/382; H01M 50/109; H01M 10/48
See application file for complete search history.

(56) References Cited

U.S. PATENT DOCUMENTS

| 10,312,555 B2 | 6/2019 | Fukuda et al. |
| 10,656,233 B2 | 5/2020 | Morrison et al. |
| 2014/0370361 A1* | 12/2014 | Cheong ............. H01M 10/0567 429/144 |
| 2016/0064780 A1 | 3/2016 | Jarvis et al. |

(Continued)

FOREIGN PATENT DOCUMENTS

| DE | 102017215144 A1 | 2/2019 |
| DE | 112018007256 T5 | 11/2020 |

(Continued)

OTHER PUBLICATIONS

Machine Translation of EP-3933956-A1 (Jun. 24, 2025) (Year: 2025).*

(Continued)

*Primary Examiner* — Matthew J Merkling

(57) ABSTRACT

A dilatometer for measuring battery dilation including: a battery cell with a first electrode and a second electrode; an internal magnetic sensing element; and a magnetic force sensor. The internal magnetic sensing element is configured to move in response to expansion the first electrode and remain stationary in response to expansion of the second electrode during dilation of the battery cell. The magnetic force sensor is stationary relative to the battery cell and configured to sense a change in magnetic force strength between the internal magnetic sensing element and the magnetic force sensor. A controller is configured to measure dilation of the first electrode independent of dilation of the second electrode based on the change in the magnetic force strength between the internal magnetic sensing element and the magnetic force sensor.

20 Claims, 6 Drawing Sheets

(56) References Cited

U.S. PATENT DOCUMENTS

2017/0077561 A1* 3/2017 Fukuda ............... H01M 10/482
2017/0092997 A1* 3/2017 Fukuda .................... G01B 7/24
2018/0156605 A1   6/2018 Swallow et al.
2020/0333376 A1  10/2020 Graf et al.

FOREIGN PATENT DOCUMENTS

| DE | 102021202154 A1 |   | 9/2022  |
|----|-----------------|---|---------|
| DE | 102021212386 A1 |   | 5/2023  |
| DE | 102022106393 A1 |   | 9/2023  |
| DE | 102023120823 A1 |   | 6/2024  |
| EP |      3933956 A1 | * | 1/2022  |
| KR |    20080109121 A |   | 12/2008 |

OTHER PUBLICATIONS

U.S. Appl. No. 18/087,452, Balogh et al.
German Office Action from counterpart DE1020241038926, dated Aug. 27, 2024.
German Office Action from counterpart DE1020241008180, dated Aug. 27, 2024.

* cited by examiner

MAGNETIC FORCE DILATOMETER FOR MEASURING DILATION OF INDIVIDUAL ELECTRODE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for measuring battery dilation, and more particularly to systems and methods for measuring dilation of an individual battery electrode.

A battery pack includes one or more battery modules each including a plurality of battery cells. The battery cells experience dilation as the battery is charged and discharged. As the battery cells charge and discharge, chemical reactions inside the battery cells cause anode or cathode electrodes to expand or dilate and to contract. Monitoring dilation of the battery cells is useful for avoiding electrode dry out, improving battery cell life, engineering battery cells, estimating energy density, and/or designing battery modules and battery packs.

SUMMARY

The present disclosure provides for a dilatometer for measuring battery dilation including: a battery cell with a first electrode and a second electrode; an internal magnetic sensing element; and a magnetic force sensor. The internal magnetic sensing element is configured to move in response to expansion the first electrode and remain stationary in response to expansion of the second electrode during dilation of the battery cell. The magnetic force sensor is stationary relative to the battery cell and configured to sense a change in magnetic force strength between the internal magnetic sensing element and the magnetic force sensor. A controller is configured to measure dilation of the first electrode independent of dilation of the second electrode based on the change in the magnetic force strength between the internal magnetic sensing element and the magnetic force sensor.

In further features, the internal magnetic sensing element is between the first electrode and the second electrode.

In further features, the battery cell includes a separator between the first electrode and the second electrode, the magnetic sensing element is between a first portion of the separator and a second portion of the separator.

In further features, the first electrode is closer to the magnetic force sensor than the second electrode.

In further features, the magnetic sensing element is configured to allow ions to pass across the magnetic sensing element to move between the first electrode and the second electrode.

In further features, the magnetic sensing element is porous and configured to allow an electrolyte of the battery cell to extend through the magnetic sensing element.

In further features, the magnetic sensing element is coated with a nonconductive material.

In further features, a support is between the first electrode and the second electrode, the support supporting the first electrode and configured to permit ions to pass across the support to move between the first electrode and the second electrode.

In further features, the magnetic sensing element is arranged adjacent to the first electrode and configured to move away from the magnetic force sensor as the first electrode expands during dilation and remain stationary as the second electrode expands during dilation.

In further features, the magnetic force sensor further includes one of a load sensor, a strain gauge, a pressure sensor, and an electromagnetic force restoration sensor.

In further features, the battery cell is a pouch cell.

In further features, the battery cell is a prismatic cell.

The present disclosure further provides for, in various features, a dilatometer for measuring dilation in a coin cell battery. The dilatometer includes: a housing of the coin cell battery; a first electrode within the housing; a second electrode within the housing; a separator in the housing between the first electrode and the second electrode; an internal magnetic sensing element within the housing configured to move in response to expansion of the first electrode and remain stationary in response to expansion of the second electrode during dilation of the coin cell battery; an external magnet outside of the housing and spaced from the housing; a sensor configured to measure magnetic force strength between the internal magnetic sensing element and the external magnet; and a controller configured to measure dilation of the first electrode independent of dilation of the second electrode based on change in the magnetic force strength measured by the sensor between the external magnet and the internal magnetic sensing element.

In further features, the internal magnetic sensing element is between a first portion of the separator and a second portion of the separator.

In further features, a support member is between a first portion of the separator and a second portion of the separator, the support member supporting the first electrode and configured to permit ions to pass across the support to move between the first electrode and the second electrode.

In further features, the internal magnetic sensing element is arranged adjacent to the first electrode and configured to move away from the sensor as the first electrode expands during dilation and remain stationary as the second electrode expands during dilation, the internal magnetic sensing element further configured as a spacer between the first electrode and a biasing member.

The present disclosure also provides for, in various features, a dilatometer for measuring dilation of a first electrode of a coin cell battery including the first electrode and a second electrode. The dilatometer includes: a coin cell holder configured to hold the coin cell battery; an external magnet arranged adjacent to the coin cell holder and spaced from the coin cell battery seated in the coin cell holder; a force sensor configured to measure magnetic force strength between the external magnet and an internal magnetic sensing element in the coin cell battery, the internal magnetic sensing element configured to move in response to expansion of the first electrode and remain stationary in response to expansion of the second electrode during dilation of the coin cell battery; a translation stage configured to support the force sensor; and a controller configured to measure dilation of the first electrode independent of dilation of the second electrode based on change in the magnetic force strength measured by the force sensor between the external magnet and the internal magnetic sensing element.

In further features, the external magnet is one of a spherical magnet, a hemispherical magnet, and a conical magnet.

In further features, the force sensor includes one of a load cell, a strain gauge, and a pressure sensor.

In further features, the coin cell holder is configured to hold the coin cell battery during at least one of charging and discharging of the coin cell battery. The controller is configured to measure dilation of the first electrode independent of the second electrode during the at least one of charging and discharging of the coin cell battery.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Battery cells such as lithium-ion batteries (LIBs) experience reversible and irreversible expansion or dilation during cycling. Accurately understanding battery cell expansion or dilation can be used to avoid electrode dry out, improve battery cell life, engineer battery cells, estimate energy density, and/or design a battery pack. For next generation anode materials such as silicon, battery cell expansion or dilation is a much bigger concern since some electrode materials experience ~300% volume change during cycling.

The present disclosure relates to a magnetic force dilatometer (MFD) configured to measure battery cell dilation during cycling. In commonly assigned U.S. patent application Ser. No. 18/087,452, filed on Dec. 22, 2022, and entitled, "SYSTEMS AND METHODS FOR MEASURING BATTERY DILATION", which is hereby incorporated by reference in its entirety, an MFD is configured to measure dilation of battery cells during cycling. Commonly assigned U.S. patent application Ser. No. 18/305,075 filed on Apr. 21, 2023 and titled "MAGNETIC FORCE DILATOMETER WITH TEMPERATURE COMPENSATION" is also hereby incorporated by reference in its entirety.

An MFD according to the present disclosure is configured to measure dilation of an individual electrode of a battery cell independent of dilation of the other electrode of the battery cell. The ability to measure individual electrode dilation enhances overall understanding of battery cell dilation. Knowing the rate of dilation of an individual electrode and the conditions under which the electrode dilates will facilitate advancements in battery cell technology.

Figure 1A:
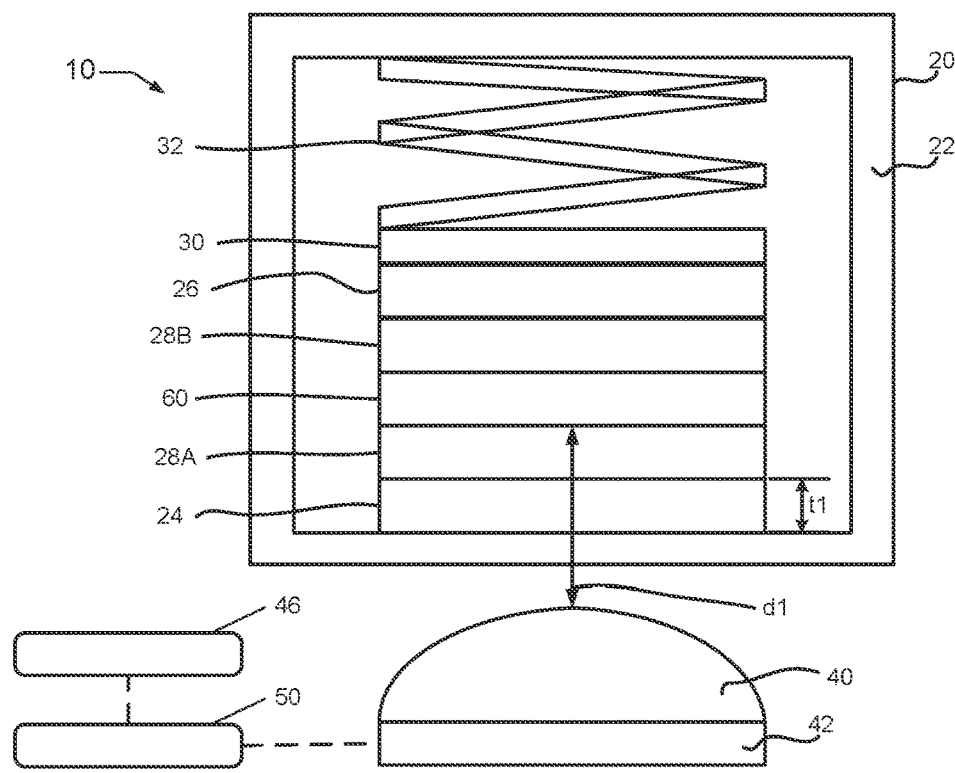
FIGS. 1A and 1B are side views of an example of a magnetic force dilatometer (MFD) for measuring dilation of an individual electrode of a battery cell according to the present disclosure.
Figure 1B:
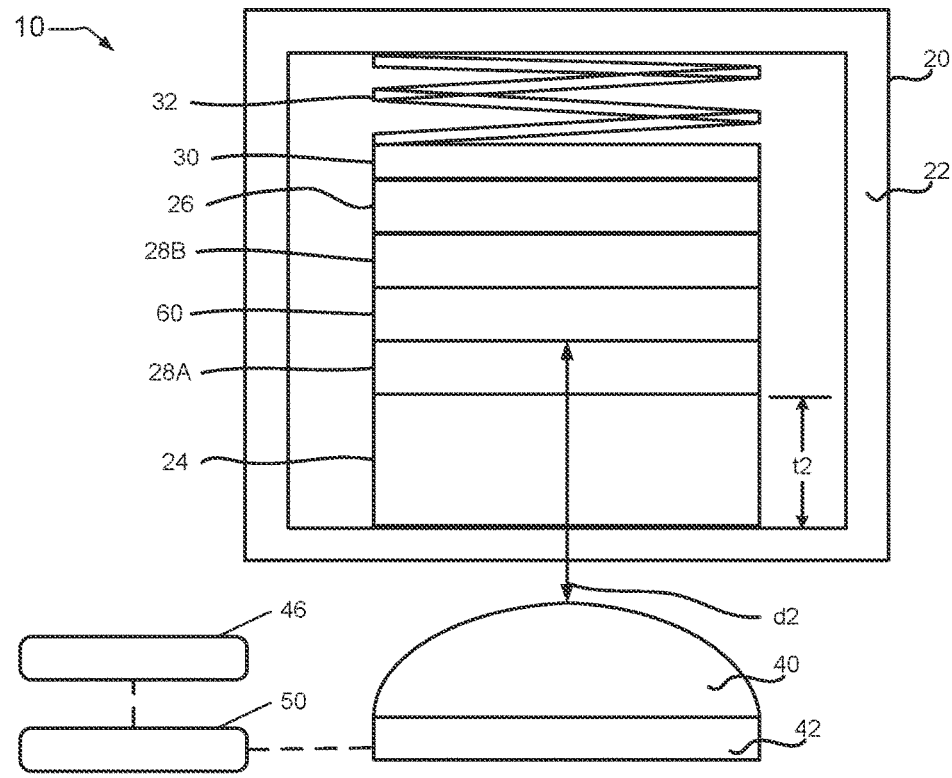

Referring now to FIGS. 1A and 1B, an MFD 10 for measuring battery dilation is shown. The MFD 10 includes a battery cell 20 (e.g., a lithium ion battery cell). The battery cell 20 includes a housing 22 enclosing one or more sets of first electrodes 24, second electrodes 26, and separators 28. The separators 28 each include a first portion 28A and a second portion 28B. A spacer 30 is arranged adjacent to the second electrode 26.

A biasing member 32 (e.g., a spring) is arranged between the spacer 30 and an inner surface of the housing 22. The biasing member 32 holds the spacer 30 against the second electrode 26, and is flexible to accommodate movement of the spacer 30 as the first electrode 24 and/or the second electrode 26 expand during dilation.

Between the first electrode 24 and the second electrode 26 is a magnetic sensing element 60, which is an internal magnet. The magnetic sensing element 60 (e.g., a permanent magnet, an electromagnet, or a ferromagnetic material) is arranged to move within the housing 22 as the first electrode 24 expands during dilation of the battery cell 20. The magnetic sensing element 60 remains stationary during individual dilation of the second electrode 26. The magnetic sensing element 60 is between the first portion 28A and the second portion 28B of the separator. The magnetic sensing element 60 is configured to permit passage of ions across the magnetic sensing element 60 between the first electrode 24 and the second electrode 26. For example, the magnetic sensing element 60 may include wire mesh made of nickel or steel, or otherwise be porous, to allow electrolyte to pass therethrough. The magnetic sensing element 60 may also be filled with an electrolyte, or made ionically conductive in any suitable manner. The magnetic sensing element 60 may be coated with any suitable material that is not electrically conductive to isolate the first electrode 24 and the second electrode 26, thereby preventing a short-circuit. For example, the magnetic sensing element 60 may be coated with aluminum oxide or a polymeric coating, such as polypropylene or polyethylene. The separator 28 is optional, particularly when the magnetic sensing element 60 is coated with a non-conductive coating.

The MFD 10 further includes an external magnet 40, which is arranged outside of the housing 22 of the battery cell 20 and spaced from the housing 22. The external magnet 40 may be a hemispherical magnet, a spherical magnet, a conical magnet, a cylindrical magnet, a square magnet, a rectangular magnet, or any other suitable magnet. The external magnet 40 and the magnetic sensing element 60 are arranged within each other's magnetic fields.

The MFD 10 also includes a sensor 42 configured to measure magnetic force strength between the external magnet 40 and the magnetic sensing element 60. The sensor 42 may be any suitable force sensor, such as a load cell sensor, a strain gauge sensor, a pressure sensor, etc. In some applications, the external magnet 40 and the sensor 42 may be replaced with a Hall sensor, a magnetoresistor, a fluxgate sensor, a superconducting quantum interference device (SQUID) sensor, a resonant sensor, an induction magnetometer, a reed contact sensor, a Wiegand wire sensor, or a magnetic force sensor.

An optional temperature sensor 46 measures a temperature of a component of the MFD 10 or an environmental temperature surrounding the MFD 10. A controller 50 communicates with the sensor 42 and the temperature sensor 46.

The controller 50 is configured to determine dilation of the first electrode 24 based on changes in the magnetic force strength between the external magnet 40 and the magnetic sensing element 60. The controller 50 receives the temperature signal from the temperature sensor 46 and performs temperature correction or compensation of the measured dilation based on the temperature sensed by the temperature sensor 46.

For example, the change in dilation occurs in response to expansion of the first electrode 24 and/or due to variations in temperature during the dilation measurement. Expansion or dilation causes movement of the magnetic sensing element 60 relative to the external magnet 40. However, the dilation measurement is affected by temperature. In other words, measurement of dilation of the battery cell at one temperature will be different than measurement of dilation of the battery cell at another temperature. The controller 50 compensates the dilation measurements based on the measured temperature.

In FIG. 1A, the battery cell 20 is shown in a non-dilated state with the external magnet 40 spaced from the magnetic sensing element 60 at a distance d1. The first electrode 24 has a thickness t1. In FIG. 1B, the battery cell 20, and specifically the first electrode 24 is shown in a dilated state. The thickness of the first electrode 24 increased from t1 to t2. As the first electrode 24 increases in thickness, the magnetic sensing element 60 moves further away from the external magnet 40. For example, in the non-dilated state of FIG. 1A, the magnetic sensing element 60 is arranged at a distance d1 from the external magnet 40. In the dilated state of FIG. 1B, the magnetic sensing element 60 is arranged at a distance d2 from the external magnet 40, which is greater than the distance d1. At distance d2, the magnetic attraction between the external magnet 40 and the magnetic sensing element 60 is less than at distance d1.

In some examples, the controller 50 uses one or more formulas relating dilation to the load cell measurement and/or temperature. In other examples, the controller 50 includes memory storing a first calibration table storing dilation as a function of the load cell measurement and a second calibration table storing dilation compensation values as a function of temperature. The first calibration table includes the known magnetic force strength between the external magnet 40 and the internal magnetic sensing element 60 at different distances d. The second calibration table stores dilation compensation values at different temperatures. In some examples, the first and second calibration tables are combined into a single table indexed by the load cell measurement and the measured temperature and/or strain, which is a function of temperature.

Using the first and/or second calibration tables, the controller 50 determines the distance d2 between external magnet 40 and the magnetic sensing element 60 corresponding to the magnetic strength measured by the sensor 42 as compensated based on the measured temperature. The change in distance (d2−d1) represents the dilation (t2−t1) of the first electrode 24.

The dilation data can be used for a variety of different purposes. For example, knowing the degree to which the first electrode 24 of the battery cell 20 has dilated after a particular number of charge/discharge cycles and/or under various conditions can be useful for designing batteries that are less susceptible to electrode dry out and have increased cell life. The information may also be used during engineering of the battery cells, estimating energy density, and designing various battery modules and packs. An exemplary calibration procedure is explained in further detail herein.

Figure 2:
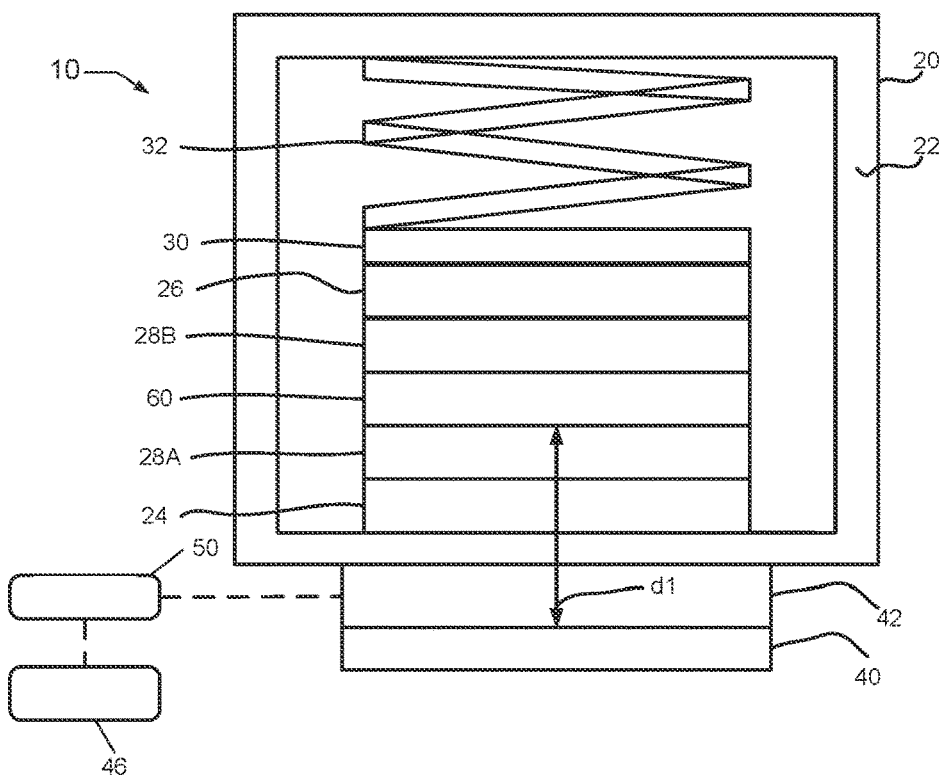
FIGS. 2 and 3 are side views of other examples of MFDs for measuring dilation of an individual electrode of a battery cell according to the present disclosure.
Figure 3:
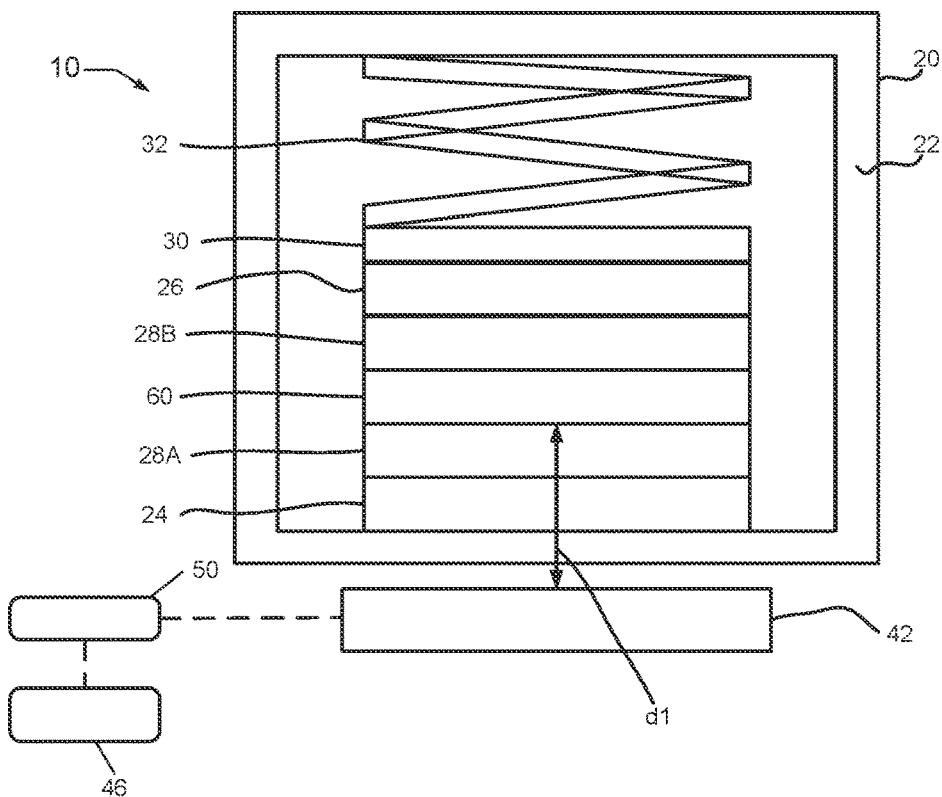

Referring now to FIG. 2, the sensor 42 is arranged between the external magnet 40 and the housing 22. The sensor 42 is in direct contact with the housing 22 and includes a pressure sensor. Referring now to FIG. 3, the sensor 42 comprises a magnetic sensor. In some examples, the sensor 42 is selected from a group consisting of a Hall sensor, a magnetoresistor sensor, a fluxgate sensor, a sensor including a superconducting quantum interference device (SQUID), a resonant sensor, an induction magnetometer, a reed contact sensor, a Wiegand wire sensor, and/or a magnetic force sensor. The sensor 42 is spaced from the housing 22.

Figure 4A:
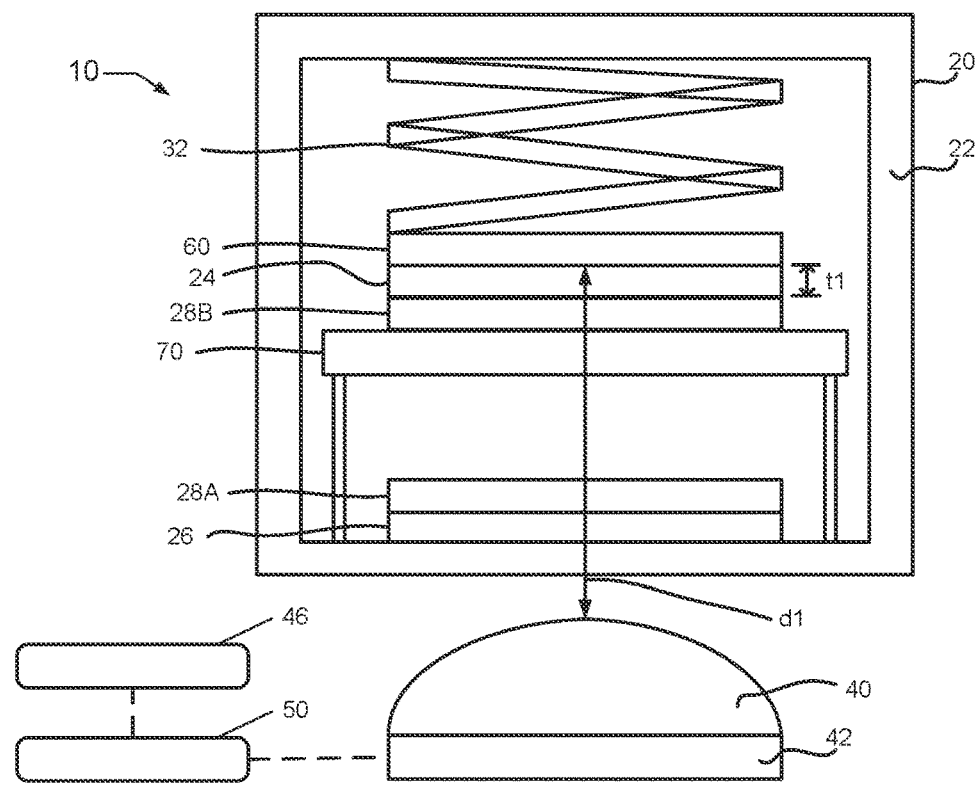
FIGS. 4A and 4B are side views of another example of an MFD for measuring dilation of an individual electrode of a battery cell.
Figure 4B:
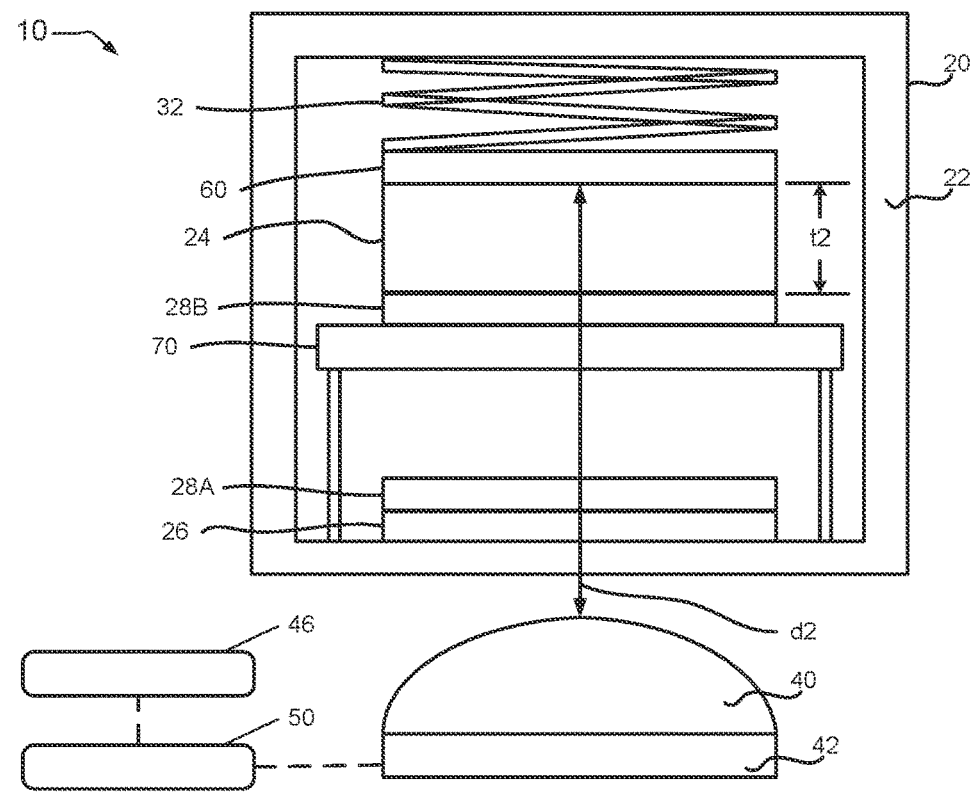

FIGS. 4A and 4B illustrate another configuration of the MFD 10 in accordance with the present disclosure, which includes a support 70. The support 70 is a rigid support member mounted within the battery cell 20 in any suitable manner such that the support 70 remains stationary. The support 70 is between the first electrode 24 and the second electrode 26. The support 70 is also between the first portion 28A and the second portion 28B of the separator. The support 70 is configured to support the first electrode 24. The first electrode 24 may be seated directly on the support 70, or the second portion 28B of the separator may be arranged between the support 70 and the first electrode 24. The second electrode 26 is beneath the support 70, and the first portion 28A of the separator is on the second electrode 26. A gap is defined between the support 70 and the second electrode 26 to allow for expansion of the second electrode 26 during dilation thereof.

The support 70 is made of any suitable material configured to allow ions to pass between the first electrode 24 and the second electrode 26. For example, the support 70 may be made of the same material as the magnetic sensing element 60 described above in the discussion of FIGS. 1A and 1B. The support 70 is not configured as a sensing element, however, and thus need not be magnetic. The support 70 may be made of any suitable glass frit material, for example.

In the examples of FIGS. 4A and 4B, the magnetic sensing element 60 is seated on the first electrode 24. Thus, the magnetic sensing element 60 moves in response to expansion of the first electrode 24 during dilation of the battery cell 20. Expansion of the second electrode 26 itself does not move the magnetic sensing element 60. Thus, the magnetic sensing element 60 remains stationary during expansion of the second electrode 26. The magnetic sensing element 60 acts as a spacer between the first electrode 24 and the biasing member 32 in the example of FIGS. 4A and 4B.

Prior to expansion of the first electrode 24, the first electrode 24 has a thickness t1 and the magnetic sensing element 60 is a distance d1 from the external magnet 40 (FIG. 4A). In response to expansion of the first electrode 24, the magnetic sensing element 60 moves to distance d2 from the external magnet 40 (FIG. 4B). Distance d2 is greater than distance d1. The first electrode 24 also increases in thickness from thickness t1 to thickness t2 (FIG. 4B). The controller 50 receives the change in distance from d1 to d2, and based on the change in distance is configured to measure expansion of the first electrode 24 in the same manner described above in the description of the configuration of FIGS. 1A and 1B. The configuration of FIGS. 4A and 4B is thus configured to measure dilation of the electrode furthest from the external magnet 40 (i.e., the innermost electrode). The configuration of FIGS. 1A and 1B is configured to measure dilation of the electrode closest to the external magnet 40 and the housing 22 (i.e., the outermost electrode).

Figure 5:
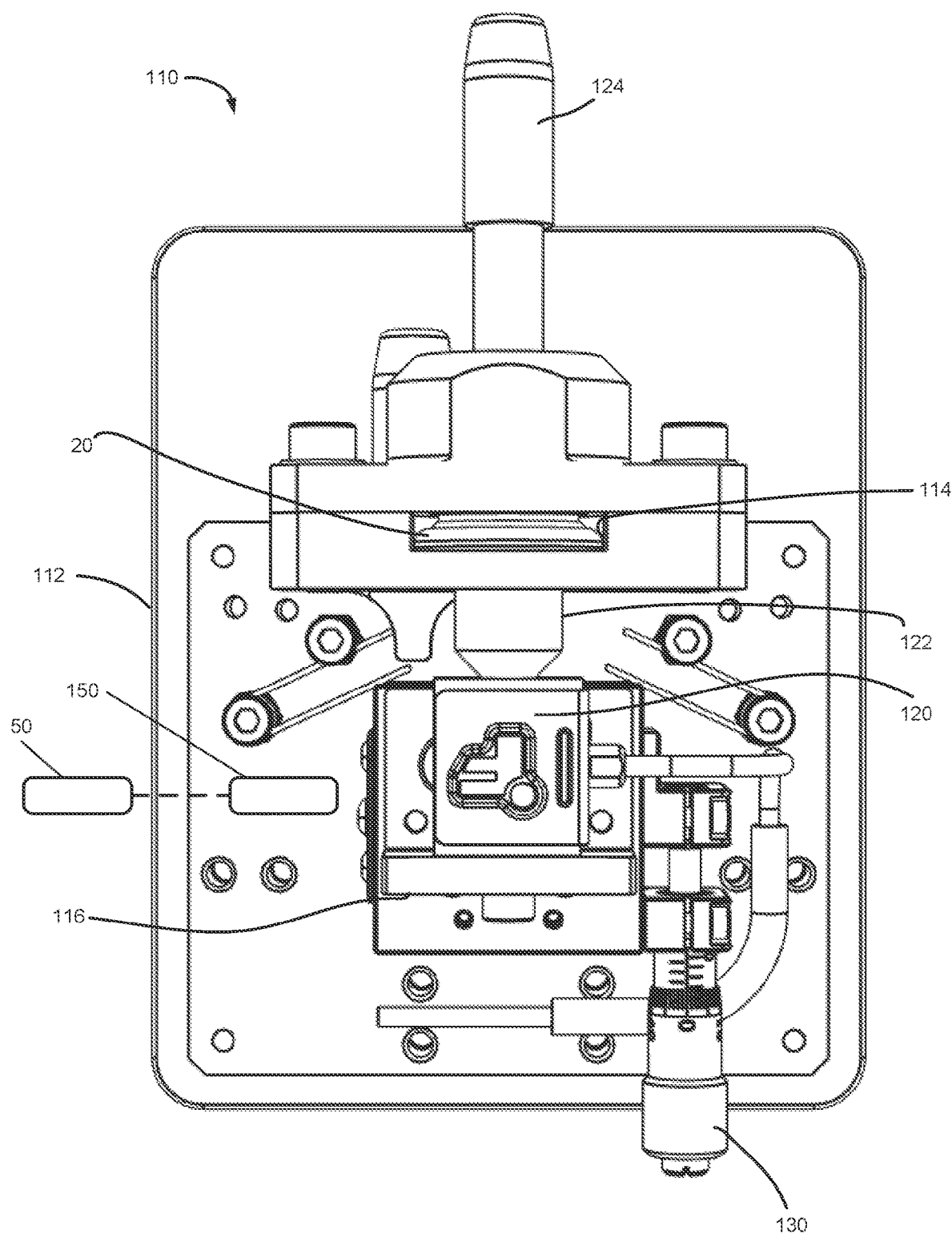
FIG. 5 is a plan view illustrating another example of an MFD for measuring dilation of a battery cell with temperature compensation according to the present disclosure.
Figure 6:
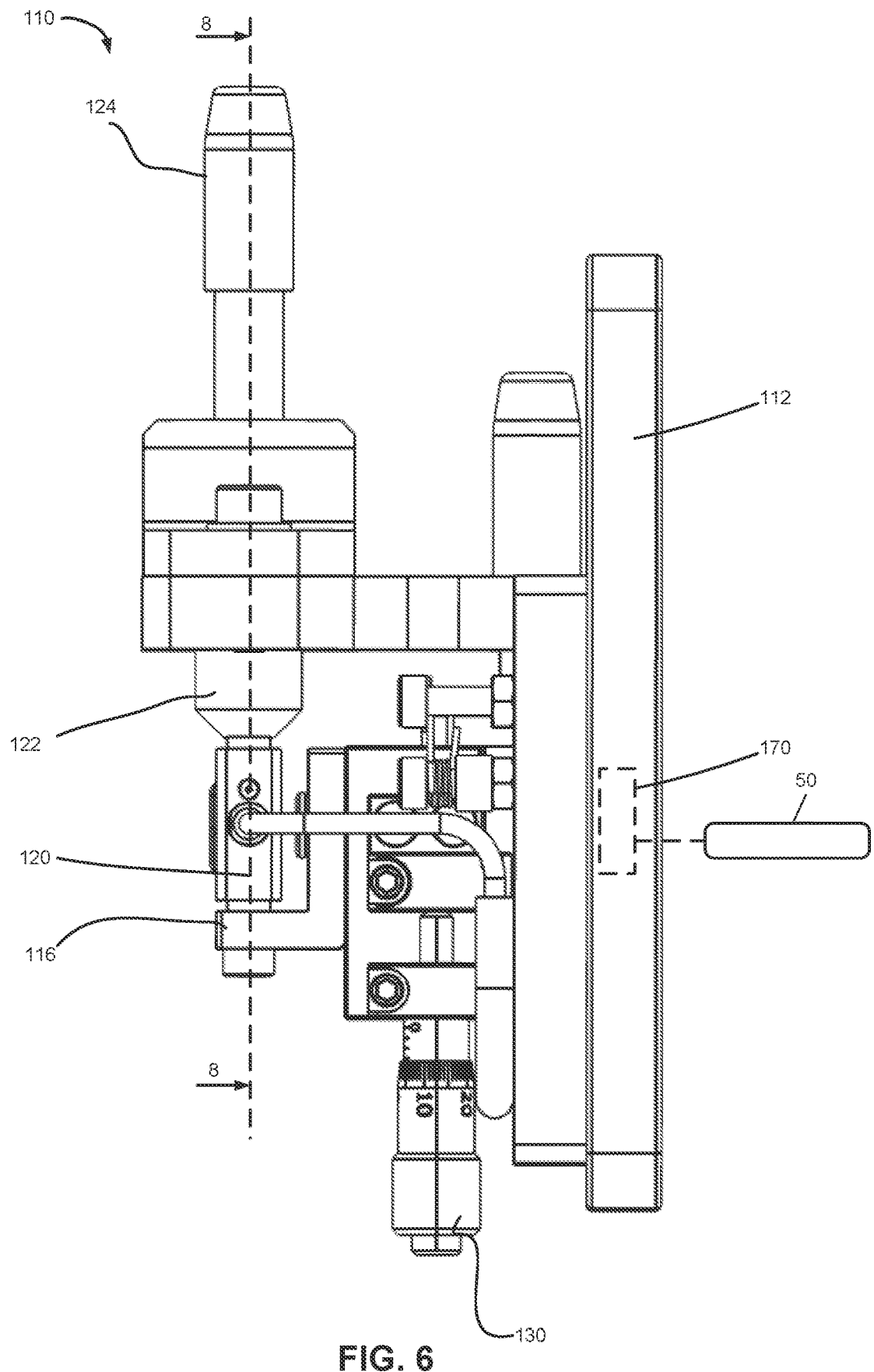
FIG. 6 is a side view of the MFD of FIG. 5.
Figure 7:
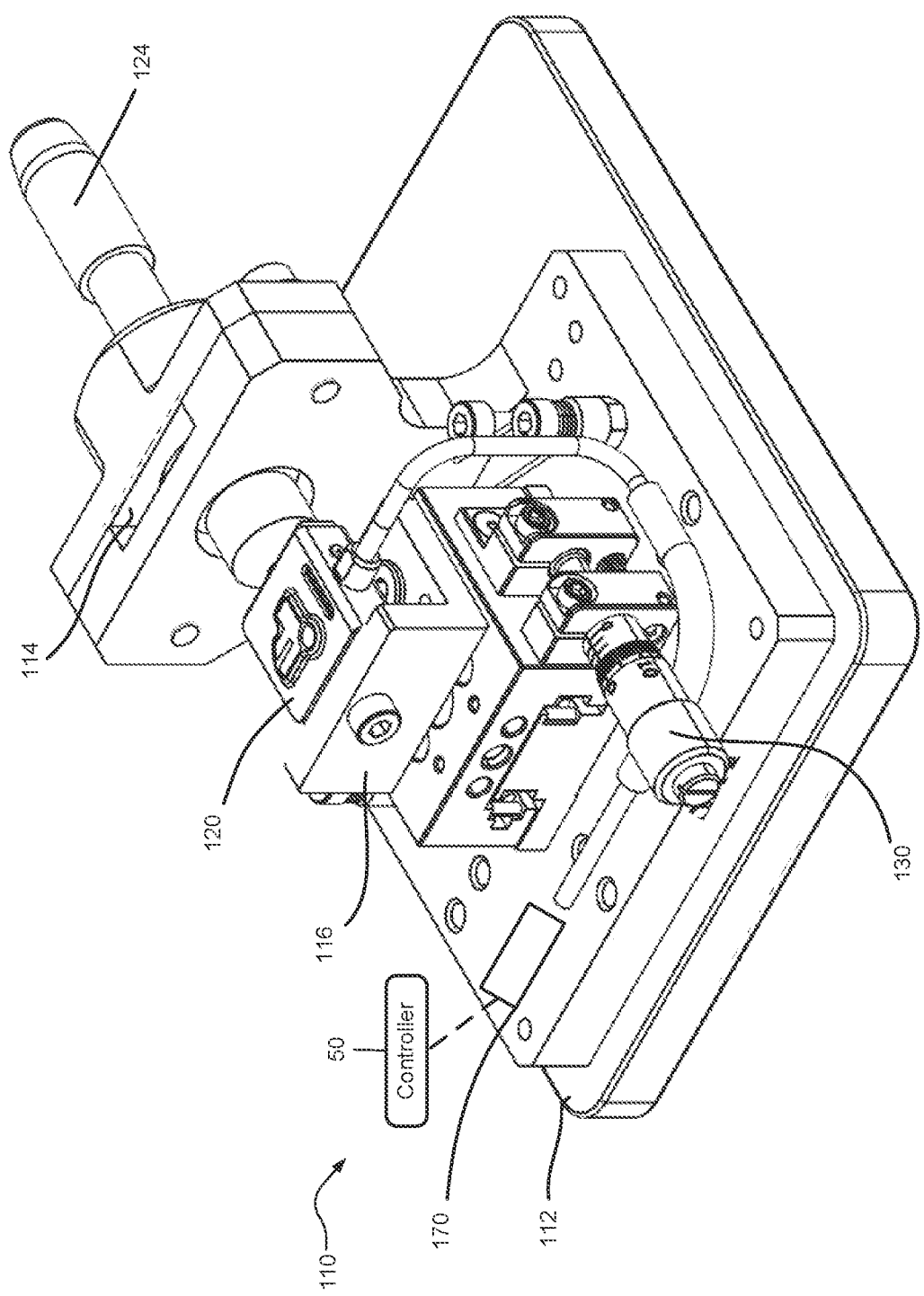
FIG. 7 is perspective view of the MFD of FIG. 5.

Referring now to FIGS. 5-7, additional examples are shown. In FIG. 5, a sensor 150 is mounted on the battery cell holder 114 and is configured to measure temperature. The measured temperature is used to compensate the measured dilation for temperature variations. In some examples, a plurality of position values for the same battery cell, different battery cells, or battery cells with different chemistry are adjusted to a predetermined temperature so that results of the dilatometer measurements can be compared to one another.

The sensor 150 may be configured as a strain sensor configured to measure strain. Because strain is a function of temperature, temperature can be inferred from the measured strain. The measured strain can be used directly to compensate the measured dilation for temperature variation. The measured strain can also be used to determine temperature which can then be used to compensate the measured dilation for temperature variations. The sensor configured as a temperature sensor may be alternatively mounted in a cavity or bore formed in battery cell holder 114 and/or another component of the MFD. In some examples, the temperature sensor comprises a thermocouple.

In FIGS. 5-7, a dilatometer 110 is configured to measure dilation with temperature compensation of any suitable battery cell as the battery cell is charged and discharged. For example, the dilatometer 110 is configured to measure real time dilation of the battery cell 20 of FIGS. 1A, 1B, 2, 3, 4A and 4B. The dilatometer 110 includes a stand 112 (e.g., base plate) and a battery cell holder 114 mounted to the stand 112.

The battery cell holder 114 is configured to hold a coin cell battery cell or other type of battery cell. Leads are connected to the battery cell 20 for charging and discharging the battery cell 20. A translation stage 116 is mounted to the battery cell holder 114 to support a load cell 120. The load cell 120 may be any suitable load cell, such as a Miniature S-Bear Jr. Load Cell 2.0 (Model LSB201) from Futek Advanced Sensor Technology, Inc. of Irvine, CA. The dilatometer 110 includes a micrometer 130 for adjusting the vertical height of the translation stage 116 and to adjust the vertical position of the load cell 120 arranged on the translation stage 116.

A magnet holder 122 is arranged on the load cell 120 and is configured to hold the external magnet 40. In this example, the external magnet 40 includes a spherical magnet. As can be appreciated, the magnet holder 122 can be configured to hold external magnets having any other suitable shape. The battery cell 20 is supported in the battery cell holder 114 between the external magnet 40 and a compression member 124, which holds the battery cell 20 in place.

The dilatometer 110 may be used to calibrate the controller 50 and to establish the calibration tables described above. For example, the calibration tables may be established as follows. Using the micrometer 130, the translation stage 116 is raised, which raises the external magnet 40. The translation stage 116 is raised until the magnetic strength measured by the load cell 120 between the external magnet 40 and the magnetic sensing element 60 begins to drop.

The magnetic strength increases until the external magnet 40 touches the housing 22, at which point the magnetic strength reading begins to drop. The translation stage 116 is adjusted up or down until the force on the load cell 120 is maximized. Once the force on the load cell 120 is maximized, the controller 50 is configured to start recording the load cell data at any suitable intervals.

For example, the controller 50 can be configured to record one or two readings per second. The translation stage 116 is then lowered at least three times in 50 μm increments while recording a plurality of values (e.g., 5-10 per step adjustment). The translation stage 116 is raised back to the starting point in 50 μm increments while recording a plurality of values (e.g., 5-10 per step adjustment). The process can be repeated for other temperatures.

After calibration, the dilatometer 110 may be used to measure dilation of the first electrode 24 of the battery cell 20, or any other suitable battery, as the battery cell 20 is run through charge and discharge cycles. Leads are connected to the dilatometer 110 for cycling the battery cell 20. The controller 50 is configured to record data from the load cell 120 at any suitable time increments, such as 5 second increments, for example.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A dilatometer for measuring battery dilation comprising:
   a battery cell including a first electrode and a second electrode;
   an internal magnetic sensing element;
   a magnetic force sensor,
   wherein the internal magnetic sensing element is configured to move in response to expansion of the first electrode and remain stationary in response to expansion of the second electrode during dilation of the battery cell, and the magnetic force sensor is stationary relative to the battery cell,
   wherein the magnetic force sensor is configured to sense a change in magnetic force strength between the internal magnetic sensing element and the magnetic force sensor; and
   a controller configured to measure dilation of the first electrode independent of dilation of the second electrode based on the change in the magnetic force strength between the internal magnetic sensing element and the magnetic force sensor.

2. The dilatometer of claim 1, wherein the internal magnetic sensing element is between the first electrode and the second electrode.

3. The dilatometer of claim 1, wherein the battery cell further includes a separator between the first electrode and the second electrode, the internal magnetic sensing element is between a first portion of the separator and a second portion of the separator.

4. The dilatometer of claim 1, wherein the first electrode is closer to the magnetic force sensor than the second electrode.

5. The dilatometer of claim 1, wherein the internal magnetic sensing element is configured to allow ions to pass across the internal magnetic sensing element to move between the first electrode and the second electrode.

6. The dilatometer of claim 5, wherein the internal magnetic sensing element is porous and configured to allow an electrolyte of the battery cell to extend through the internal magnetic sensing element.

7. The dilatometer of claim 5, wherein the internal magnetic sensing element is coated with a nonconductive material.

8. The dilatometer of claim 1, further comprising a support between the first electrode and the second electrode, the support supporting the first electrode and configured to permit ions to pass across the support to move between the first electrode and the second electrode.

9. The dilatometer of claim 8, wherein the internal magnetic sensing element is arranged adjacent to the first electrode and configured to move away from the magnetic force sensor as the first electrode expands during dilation and remain stationary as the second electrode expands during dilation.

10. The dilatometer of claim 1, wherein the magnetic force sensor further includes one of a load sensor, a strain gauge, a pressure sensor, and an electromagnetic force restoration sensor.

11. The dilatometer of claim 1, wherein the battery cell is a pouch cell.

12. The dilatometer of claim 1, wherein the battery cell is a prismatic cell.

13. A dilatometer for measuring dilation in a coin cell battery, the dilatometer comprising:
 a housing of the coin cell battery;
 a first electrode within the housing;
 a second electrode within the housing;
 a separator in the housing between the first electrode and the second electrode;
 an internal magnetic sensing element within the housing configured to move in response to expansion of the first electrode and remain stationary in response to expansion of the second electrode during dilation of the coin cell battery;
 an external magnet outside of the housing and spaced from the housing;
 a sensor configured to measure magnetic force strength between the internal magnetic sensing element and the external magnet; and
 a controller configured to measure dilation of the first electrode independent of dilation of the second electrode based on change in the magnetic force strength measured by the sensor between the external magnet and the internal magnetic sensing element.

14. The dilatometer of claim 13, wherein the internal magnetic sensing element is between a first portion of the separator and a second portion of the separator.

15. The dilatometer of claim 13, further comprising a support member between a first portion of the separator and a second portion of the separator, the support member supporting the first electrode and configured to permit ions to pass across the support to move between the first electrode and the second electrode.

16. The dilatometer of claim 15, wherein the internal magnetic sensing element is arranged adjacent to the first electrode and configured to move away from the sensor as the first electrode expands during dilation and remain stationary as the second electrode expands during dilation, the internal magnetic sensing element further configured as a spacer between the first electrode and a biasing member.

17. A dilatometer for measuring dilation of a first electrode of a coin cell battery including the first electrode and a second electrode, the dilatometer comprising:
 a coin cell holder configured to hold the coin cell battery;
 an external magnet arranged adjacent to the coin cell holder and spaced from the coin cell battery seated in the coin cell holder;
 a force sensor configured to measure magnetic force strength between the external magnet and an internal magnetic sensing element in the coin cell battery, the internal magnetic sensing element configured to move in response to expansion of the first electrode and remain stationary in response to expansion of the second electrode during dilation of the coin cell battery;
 a translation stage configured to support the force sensor; and
 a controller configured to measure dilation of the first electrode independent of dilation of the second electrode based on change in the magnetic force strength measured by the force sensor between the external magnet and the internal magnetic sensing element.

18. The dilatometer of claim 17, wherein the external magnet is one of a spherical magnet, a hemispherical magnet, and a conical magnet.

19. The dilatometer of claim 17, wherein the force sensor includes one of a load cell, a strain gauge, and a pressure sensor.

20. The dilatometer of claim 17, wherein:
 the coin cell holder is configured to hold the coin cell battery during at least one of charging and discharging of the coin cell battery; and
 wherein the controller is configured to measure dilation of the first electrode independent of the second electrode during the at least one of charging and discharging of the coin cell battery.

\* \* \* \* \*